United States Patent
Singh et al.

(10) Patent No.: US 9,787,558 B2
(45) Date of Patent: *Oct. 10, 2017

(54) IDENTIFYING CONFIGURATION INCONSISTENCY IN EDGE-BASED SOFTWARE DEFINED NETWORKS (SDN)

(71) Applicant: International Business Machines Corporation, Armonk, NY (US)

(72) Inventors: Rahul Singh, Mountain View, CA (US); Shu Tao, Irvington, NY (US); Yang Xu, Brooklyn, NY (US)

(73) Assignee: International Business Machines Corporation, Armonk, NY (US)

( * ) Notice: Subject to any disclaimer, the term of this patent is extended or adjusted under 35 U.S.C. 154(b) by 103 days.

This patent is subject to a terminal disclaimer.

(21) Appl. No.: 14/747,300

(22) Filed: Jun. 23, 2015

(65) Prior Publication Data

US 2016/0112246 A1    Apr. 21, 2016

Related U.S. Application Data

(63) Continuation of application No. 14/517,351, filed on Oct. 17, 2014.

(51) Int. Cl.
*G06F 15/173* (2006.01)
*H04L 12/26* (2006.01)
(Continued)

(52) U.S. Cl.
CPC ........ *H04L 43/065* (2013.01); *H04L 41/0853* (2013.01); *H04L 41/0873* (2013.01);
(Continued)

(58) Field of Classification Search
CPC ............... H04L 41/046; H04L 41/0853; H04L 41/0873; H04L 43/065; H04L 67/10
See application file for complete search history.

(56) References Cited

U.S. PATENT DOCUMENTS 8,040,798 B2    10/2011 Chandra et al.
9,128,622 B1 *  9/2015 Yang ................... G06F 9/45558
(Continued)

OTHER PUBLICATIONS

Office Action dated Oct. 7, 2016 received in U.S. Appl. No. 14/517,351, 14 pages.
(Continued)

*Primary Examiner* — Mohamed Wasel
(74) *Attorney, Agent, or Firm* — Scully, Scott, Murphy & Presser, P.C.; Louis J. Percello, Esq.

(57) ABSTRACT

Identifying state inconsistency in edge-based software defined networks is disclosed. A verification server may receive controller network configuration data from a controller of an edge-based software defined network (SDN) and end-host network configuration data from at least one end-host of the SDN. The verification server may parse the controller network configuration data into a network state representation and the end-host network configuration data into the network state representation. The network state representation of the controller network configuration data and the end-host network configuration data may be compared to identify state inconsistency in the SDN. Responsive to identifying the state inconsistency, an alert and/or a report may be generated and transmitted to an administrator user interface.

10 Claims, 14 Drawing Sheets

(51) Int. Cl.
*H04L 12/24* (2006.01)
*H04L 29/08* (2006.01)

(52) U.S. Cl.
CPC ........ *H04L 41/046* (2013.01); *H04L 41/0893* (2013.01); *H04L 41/22* (2013.01); *H04L 67/10* (2013.01); *H04L 67/1097* (2013.01)

(56) References Cited

U.S. PATENT DOCUMENTS

| | | | | |
|---|---|---|---|---|
| 2009/0326899 | A1* | 12/2009 | Ghorbani | H04L 63/1433 703/13 |
| 2010/0309820 | A1 | 12/2010 | Rajagopalan et al. | |
| 2012/0266013 | A1 | 10/2012 | Shannon et al. | |
| 2013/0227689 | A1* | 8/2013 | Pietrowicz | G01R 1/20 726/23 |
| 2014/0189074 | A1* | 7/2014 | Parker | H04L 63/20 709/220 |
| 2014/0193154 | A1* | 7/2014 | Graham | H04L 67/28 398/79 |
| 2014/0280488 | A1* | 9/2014 | Voit | H04L 67/10 709/203 |
| 2014/0280893 | A1* | 9/2014 | Pfeifer | H04L 43/04 709/224 |
| 2015/0039744 | A1* | 2/2015 | Niazi | H04L 43/0876 709/224 |
| 2015/0169340 | A1* | 6/2015 | Haddad | G06F 9/45533 718/1 |
| 2015/0172300 | A1* | 6/2015 | Cochenour | H04L 63/145 726/23 |
| 2016/0050132 | A1* | 2/2016 | Zhang | H04L 29/08153 370/252 |
| 2016/0219348 | A1* | 7/2016 | Formo | G08B 25/002 |

OTHER PUBLICATIONS

Zeng, H., et al., "Automatic Test Packet Generation", Co-NEXT'12, Dec. 10-13, 2012, 12 pages, Nice, France.
Yuan, L., et al., "FIREMAN: A Toolkit for FIREwall Modeling and ANalysis", Security and Privacy, 2006 IEEE Symposium, Date of Conference: May 21-24, 2006, 15 pages, Conference Location: Berkeley/Oakland, CA.
Smith, T.F., et al., "Identification of Common Molecular Subsequences", J. Mol. Biol., Mar. 25, 1981, pp. 195-197, 147 (1).
Reitblatt, M., et al., "Abstractions for Network Update", SIGCOMM'12, Aug. 13-17, 2012, 12 pages, Helsinki, Finland.
https://www.openstack.org/, printed on Oct. 16, 2014, 6 pages.
https://www.opennetworking.org/, printed on Oct. 17, 2014, 2 pages.
Needleman, S.B., et al., "A General Method Applicable to the Search for Similarities in the Amino Acid Sequence of Two Proteins", J. Mol. Biol., 48, pp. 443-453.
Mayer, A., et al., "Fang: A Firewall Analysis Engine", Security and Privacy, S&P 2000. IEEE Symposium, Date of Conference: May 14-17, 2000, pp. 177-187, Conference Location: Berkeley, CA.
Mai, H., et al., "Debugging the Data Plane with Anteater", SIGCOMM'11, Aug. 15-19, 2011, 12 pages, Toronto, Ontario, Canada.
Khurshid, A., et al., "VeriFlow: Verifying Network-Wide Invariants in Real Time", USENIX Symposium on Networked Systems Design and Implementaion (NSDI) Apr. 2-5, 2013, 13 pages, Lombard, IL.
Kazemian, P. et al., "Real Time Network Policy Checking using Header Space Analysis", USENIX Symposium on Networked Systems Design and Implementaion (NSDI) Apr. 2-5, 2013, 13 pages, Lombard, IL.
Kazemian, P. et al., "Header Space Analysis: Static Checking for Networks", 9th USENIX Symposium on Networked Systems Design and Implementaion (NSDI) Apr. 25-27, 2012, 14 pages, San Jose, CA.
Ju, X., et al., "Towards a Fault-Resilient Cloud Management Stack", 5th USENIX Workshop on Hot Topics in Cloud Computing, Jun. 25-26, 2013, 5 pages, San Jose, CA.
Higgins, D. G., et al., "CLUSTAL: a package for performing multiple sequence alignment on a microcomputer", Gene., Dec. 15, 1988, pp. 237-244, 73, Elsevier.
Heller, B., et al., "Leveraging SDN Layering to Systematically Troubleshoot Networks", HotSDN'13, Aug. 16, 2013, 6 pages, Hong Kong, China.
Handigol, N., et al., "Where is the Debugger for my Software-Defined Network?", HotSDN'12, Aug. 13, 2012, 6 pages, Helsinki, Finland.
Foster, N., et al., "Frenetic: A Network Programming Language", ICFP'11, Sep. 19-21, 2011, 13 pages, Tokyo, Japan.
https://www.eucalyptus.com/, printed on Oct. 16, 2014, 2 pages.
http://cloudstack.apache.org/, printed on Oct. 16, 2014, 3 pages.
Canini, M., et al., "A NICEWay to Test OpenFlow Applications", 9th USENIX Symposium on Networked Systems Design and Implementaion (NSDI) Apr. 25-27, 2012, 14 pages, San Jose, CA.
Bryant, R. E., "Graph-Based Algorithms for Boolean Function Manipulation", IEEE Tmnsactions on Computers, Aug. 1986, pp. 677-691, vol. C-35, No. 8.
http://www.bigswitch.com/, printed Oct. 16, 2014, 5 pages.
Bartal, Y., et al., "Firmato: A Novel Firewall Management Toolkit", Journal ACM Transactions on Computer Systems (TOCS) TOCS Homepage archive, Nov. 2004, pp. 381-420, vol. 22, Issue 4.
Al-Shaer, E., et al., "FlowChecker: Configuration Analysis and Verification of Federated OpenFlow Infrastructures", SafeConfig'10, Oct. 4, 2010, pp. 37-44, Chicago, Illinois.
"14.8.2 InnoDB File-Per-Table Mode", http://dev.mysql.com/doc/refman/5.5/en/innodb-multiple-tablespaces.html, printed on Oct. 17, 2014, 5 pages.
Son, S., et al., Model Checking Invariant Security Properties in OpenFlow. Proceedings of IEEE International Conference on Communications (ICC), Jun. 2013, 6 pages.
List of IBM Patents or Patent Applications Treated as Related, dated Jun. 23, 2015, 2 pages.
Notice of Allowance dated Feb. 16, 2017 received in parent U.S. Appl. No. 14/517,351, 14 pages.

\* cited by examiner

IDENTIFYING CONFIGURATION INCONSISTENCY IN EDGE-BASED SOFTWARE DEFINED NETWORKS (SDN)

FIELD

The present application relates generally to computers and computer applications, and more particularly to problem diagnosis and health checks in a computer infrastructure, for example, that provides capability to consumers to provision processing, storage, network, and other computing resources.

BACKGROUND

Software-Defined-Networks (SDN) allows operators to manage network services through abstraction of lower level functionality into higher level network services. Edge-based SDN relies on the end-hosts to implement the lower-level network functionalities. In edge-based SDN, the lower level network configurations are distributed in hundreds or thousands of end-hosts and the high-level network service definitions are typically maintained in some controller nodes.

BRIEF SUMMARY

A method and system for identifying state inconsistency in edge-based software defined networks may be provided. A method of identifying state inconsistency in edge-based software defined networks, in one aspect, may comprise receiving controller network configuration data from a controller of an edge-based software defined network (SDN). The method may also comprise receiving end-host network configuration data from at least one end-host of the SDN. The method may further comprise parsing the controller network configuration data into a network state representation. The method may also comprise parsing the end-host network configuration data into the network state representation. The method may further comprise comparing the network state representation of the controller network configuration data and the end-host network configuration data to identify state inconsistency in the SDN. Responsive to identifying the state inconsistency, the method may further comprise generating and transmitting an alert signal to an administrator user interface.

A system for identifying state inconsistency in edge-based software defined networks, in one aspect, may comprise a verification system comprising at least one hardware processor. The verification system may be connected to a controller of an edge-based software defined network (SDN). The verification system may be further connected to at least one end-host of the SDN. The verification system may comprise a data collection subsystem operable to receive controller network configuration data from the controller of an edge-based software defined network (SDN), and the data collection subsystem may be further operable to receive end-host network configuration data from the end-host of the SDN. The verification system may further comprise a state parsing subsystem operable to parse the controller network configuration data into a network state representation, and the state parsing subsystem may be further operable to parse the end-host network configuration data into the network state representation. The verification system may further comprise a state verification subsystem operable to compare the network state representation of the controller network configuration data and the end-host network configuration data to identify state inconsistency in the SDN. Responsive to identifying the state inconsistency, the state verification subsystem may be further operable to generate and transmit an alert signal to an administrator user interface.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. The cloud model may include different characteristics, different service models and different deployment models. One of the service models includes an Infrastructure as a Service (IaaS) service model. IaaS provides the capability to the consumer to provision processing, storage, networks, and other fundamental computing resources where the consumer is able to deploy and run arbitrary software, which can include operating systems and application. The consumer does not manage or control the underlying cloud infrastructure but has control over operating systems, storage, and deployed applications, and possibly has limited control of select networking components (e.g., host firewalls).

A cloud computing environment is usually service oriented with a focus on statelessnesss, low coupling, modularity, and semantic interoperability. At the heart of cloud computing is an infrastructure comprising a network of interconnected nodes. It is understood in advance that although this disclosure includes a detailed description on cloud computing, implementation of the teachings recited herein are not limited to a cloud computing environment. Rather, embodiments disclosed herein are capable of being implemented in conjunction with any other type of computing environment now known or later developed, as applicable.

Figure 1:
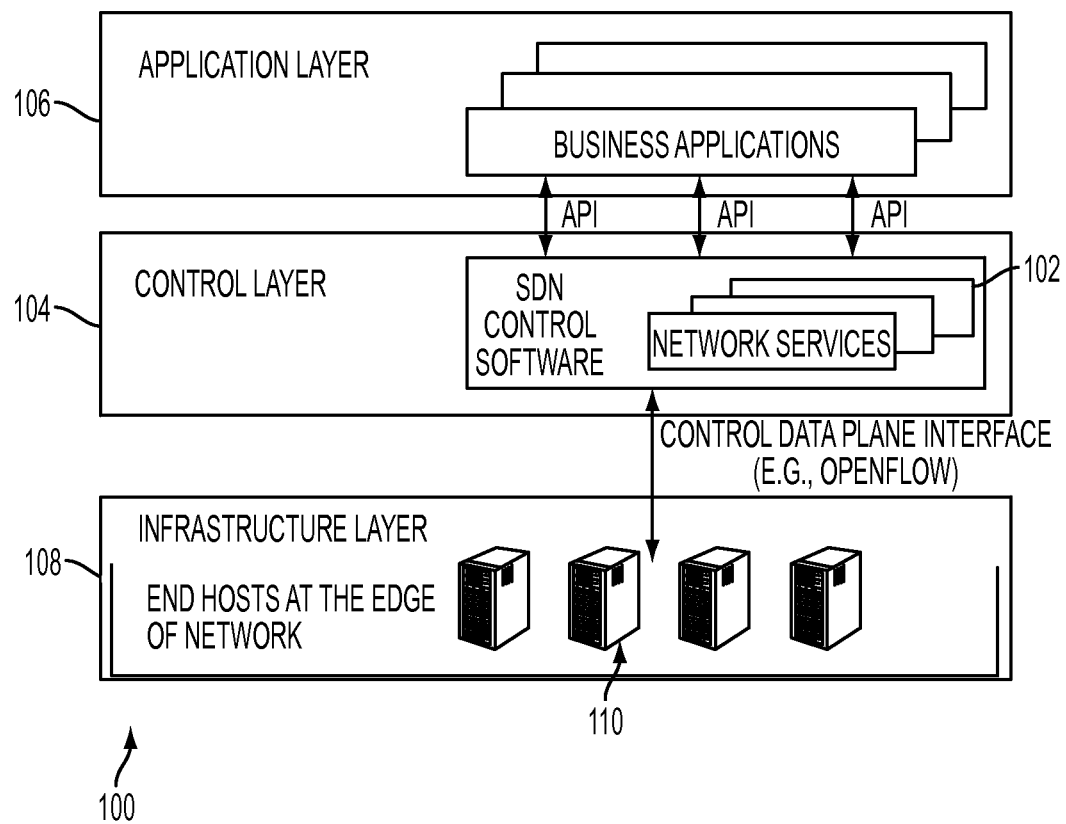
FIG. 1 illustrates an architectural overview of a system in one embodiment of the present disclosure.

The present disclosures presents a methodology and system that enable problem diagnosis and health checks, e.g., in Infrastructure-as-a-Service (IaaS) clouds based on edge-based Software Defined Networks (SDN) by routinely detecting inconsistencies in network configuration. FIG. 1 illustrates an architectural overview of a system in one embodiment of the present disclosure. IaaS cloud 100 provides infrastructure resources including compute, storage and networking capabilities on an on-demand, pay-as-you-go basis. SDN 102 is a networking paradigm that enables virtualization of networking by separating the control plane (control layer) 104 that controls the flow of data from the forwarding plane (application layer) 106 that actually forwards the data. The control plane 104 is implemented in software by a component called the controller. In edge-based SDNs, the controller configures network edges or network devices, for example, in end hosts 110 (processors and devices) in an infrastructure layer 108 to implement the control plane 104. Problem diagnosis in one embodiment involves quickly detecting and diagnosing problems that arise in cloud infrastructure to make the cloud highly reliable and keep the customers satisfied.

In Software Defined Networks (SDN), users manage network services by abstracting high level service policies from the lower level network functions. Edge-based SDN, which relies on the end hosts to implement the lower-level network functions, is adopted in cloud. A challenge in such environment is to ensure that lower level network configurations, which are distributed in many end hosts, are in sync with high-level network service definitions, which are maintained in central controller, as state inconsistency often arises in practice due to communication problems, human errors, or software bugs. The present disclosure describes, in one embodiment, an approach to systematically extracting and analyzing the network states from both controller and end hosts, and identifying the inconsistencies between them across network layers (e.g., network layers that characterize and standardize the internal functions of a communication system by partitioning it into abstraction layers, e.g., specified in the Open Systems Interconnection model (OSI)). The approach can correctly identify network state inconsistencies with little systems and network overhead, and may be adopted in large-scale production cloud to ensure healthy operations of its network services.

In Software Defined Networks (SDN), users only define high-level services and leverage programmable controller to send configurations to distributed forwarding devices to realize low-level network functions. This makes network management flexible and easy. Depending on the forwarding devices that controller configures, SDN could be categorized into two types: core-based and edge-based. In core-based SDN, the controller directly configures core network devices, such as OpenFlow switches and routers. In edge-based SDN, controller configures network edge devices, i.e., end hosts that act as virtual switches or routers. Edge-based SDN has been adopted in the emerging cloud environments.

A challenge in SDN is to ensure the consistency between high-level network service definitions and low-level configurations. This problem is more prominent in edge-based SDNs, because: (1) in such environments, low-level network configurations are distributed across potentially many end hosts, and (2) virtual switches or routers implemented in end hosts are less reliable than dedicated network devices, hence are more likely to introduce errors during their operations. If such problem arises, misconfigurations on end hosts can potentially break the intended network functions. In a multi-tenant cloud, this may even lead to security breaches by exposing private network traffic to unintended users.

An embodiment of a methodology in the present disclosure addresses a problem of identifying state inconsistencies between controller and end hosts in edge-based SDN. Such inconsistencies may arise, for example, due to the following reasons:

Communication problems: In many implementations of edge-based SDN, e.g., network service in a cloud environment, controller sends network configurations to end hosts through asynchronous messages. If messages are lost or communication is disrupted during the configuration process, the states between these two can become out of sync. Until the communication mechanism between controller and end hosts become fully resilient to communication errors, operators need to deal with state inconsistencies introduced by such errors.

Human errors: The commodity servers used to build today's cloud may not always be reliable. System administrators often need to reboot, patch or repair the system manually. This process can potentially introduce errors in the virtual network configurations.

Software bugs: The network configurations pushed into end hosts may not always exactly reflect the network policies defined at the controller, for example, due to possible software bugs present in edge-based SDN implementations.

A methodology is presented in the present disclosure in one embodiment, which for example addresses those issues, that systematically identifies the state inconsistencies between a controller and end hosts. The methodology in one embodiment may routinely collect networking configuration data from the edge hosts and the configuration data present in the controller database to indicate possible deviations between the two. This approach captures misconfigurations present at the edge-hosts that may make the network state different than the state intended by an administrator, e.g., the cloud administrator.

Edge host data may include data pertaining to various networking layers, e.g., including iptables or like facility, Linux bridges or like facility, network namespaces, and others. Briefly, iptables is used to set up, maintain, and inspect the tables of Internet Protocol (IP) packet filter rules in the Linux kernel. While the description herein refers to iptables as an example facility that specifies IP packet filter rules, it should be understood that the methodologies of the present disclosure are not limited to analyzing iptables per se; rather, the methodologies of the present disclosure may work with another facility that provides like functionality. In addition, while the description herein refers to Linux as an example operating system kernel, it should be understood that the methodologies of the present disclosure are not limited to one specific operating system.

Controller data may include data stored in various databases pertaining to virtual local area networks (LANs), virtual interfaces, security groups, and others. The methodology in one embodiment may include converting the current configuration state of network obtained from the controller and the infrastructure into a common and compact format, finding differences between the configurations obtained from the controller and the infrastructure, and performing incremental updates to quickly construct configuration state for small changes.

The data collected at the infrastructure layer and the controller layer in one embodiment of the present disclosure is converted into a common format so that the configuration information can be compared for detecting differences. In one embodiment, this process may be performed periodically where only the changes that have happened since the last iteration are incrementally used to update the configuration state.

Figure 2:
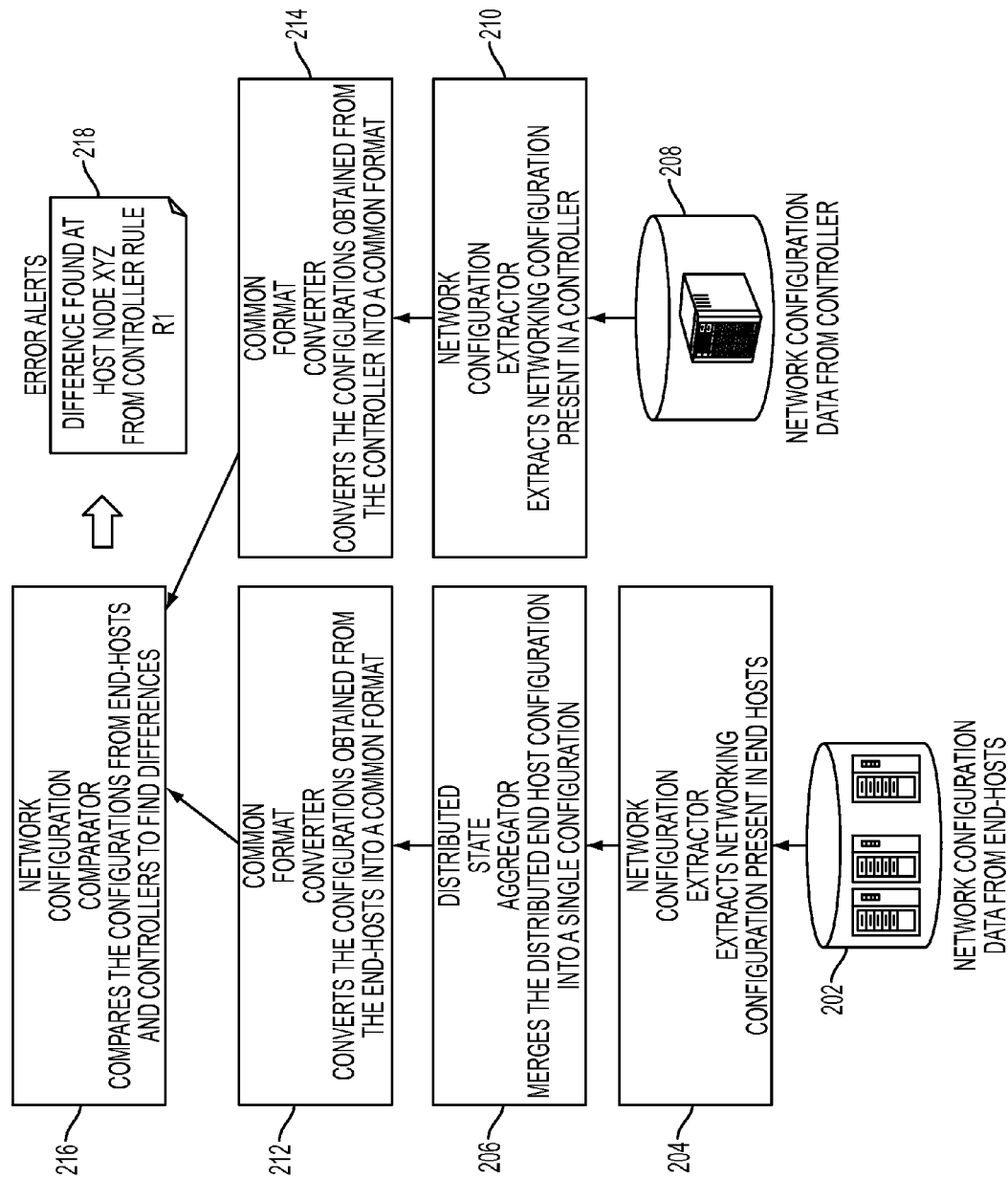
FIG. 2 illustrates an overview of a methodology in one embodiment of the present disclosure.

FIG. 2 illustrates an overview of a methodology in one embodiment of the present disclosure. At 204, a network configuration extractor component or functionality may extract networking configuration present in end hosts 202. At 204, multiple kinds of configuration information from the edge-hosts may be collected, the configuration information spanning the various networking layers, e.g., the L1 physical layer, L2 link layer, L3 network layer, and L4 transport layer. For example, an Edge-host configuration extraction agent may routinely collect L1, L2, L3 and/or L4 network configuration from the edge-hosts. This information may be then sent to a processing component such as a central verification server that uses, e.g., a configuration conversion engine to convert this information from different formats into a common format.

At 206, the extracted networking configuration data are received, and a distributed state aggregator component or functionality may merge the distributed end host configuration into a single configuration.

At 210, a network configuration extractor component or functionality may extract networking configuration present in a controller 208. In one embodiment, to collect configuration information from the controller, information may be extracted from databases and parsed to convert them in the same format as the information collected from edge-hosts. For example, a controller node configuration extraction agent may routinely collect L1, L2, L3, and/or L4 network configuration from a controller node. This information may be then sent to a processing component such as a central verification server, e.g., that uses the configuration conversion engine to convert this information from different formats into a common format.

At 212, a common format converter component or functionality (e.g., also referred to as a configuration conversion engine) may convert the configurations obtained from the end-hosts into a common format. At 214, a common format converter component or functionality may convert the configurations obtained from the controller into a common format. Common formats are also referred to as state representations below, examples of which are described in detail below.

Once this information is converted into a common format, a multi-layered configuration verification engine may perform comparison and verification spanning multiple network layers to detect inconsistencies between edge-hosts and controller. For example, at 216, a network configuration comparator or functionality may compare the configurations from end-hosts and controllers to find differences. In one embodiment, to compare the configurations obtained from the edge-hosts and that from the controller, a multi-level verification may be performed. For example, the comparison may start with verifying the L1 layer configuration. Only if this configuration information is verified to be the same at the edge-hosts and the controller may the comparison then go ahead to performing L2 layer configuration. This process may be performed similarly for verifying that the L3 layer configurations and L4 layer configurations are in sync.

A sample error alert is shown at 218. For instance, based on the differences discovered at 216, an error alert such as shown at 218 may be generated.

The above processing steps may be repeated periodically, for example, each time taking the new changes observed over last iteration to incrementally update the past configuration state.

Figure 3:
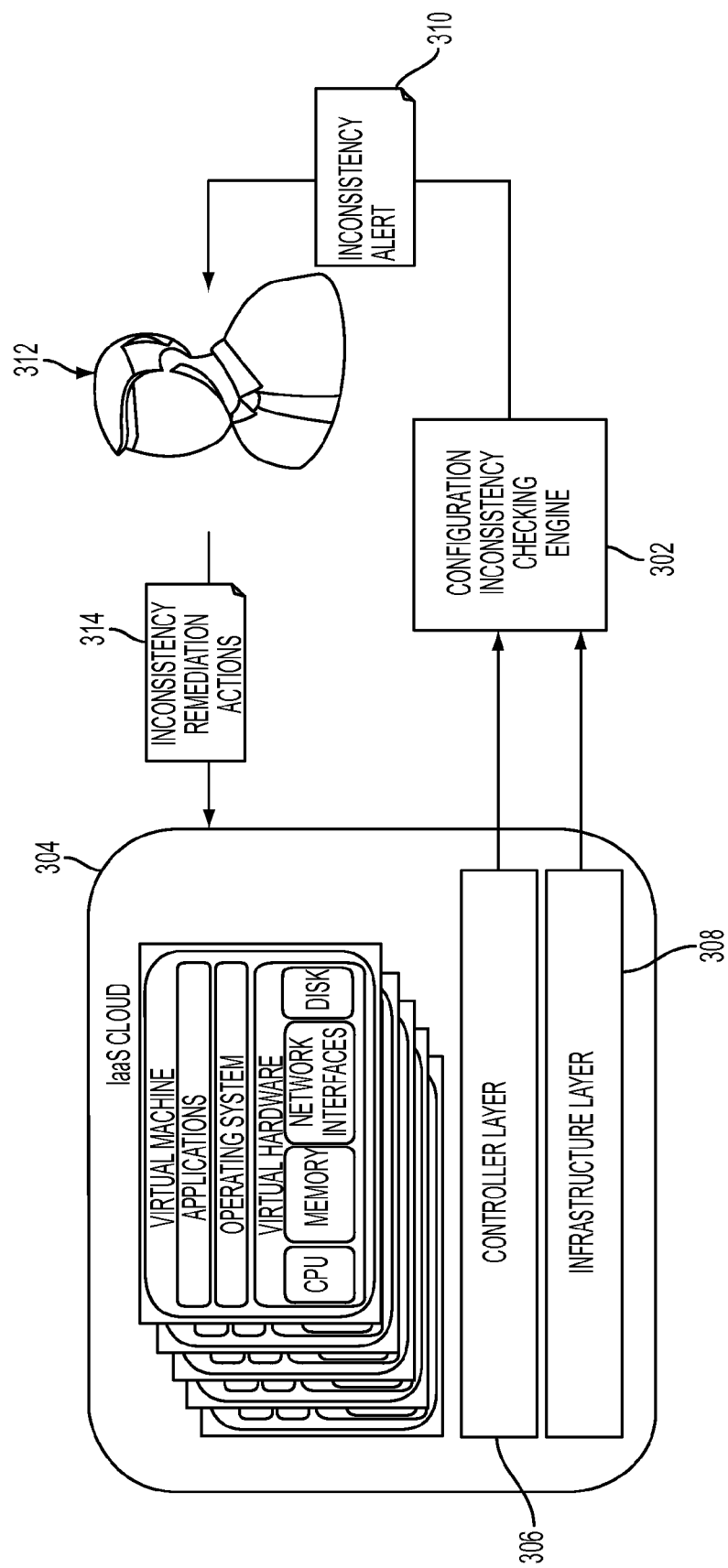
FIG. 3 is a diagram illustrating an overview of a use scenario in one embodiment of the present disclosure.

FIG. 3 is a diagram illustrating an overview of a use scenario in one embodiment of the present disclosure. A configuration inconsistency checking engine 302, which may perform the functionalities described with reference to FIG. 2 above, may run periodically to detect any differences between configurations at the controller layer 306 and infrastructure layer 308, e.g., of an IaaS cloud 304. The configuration inconsistency checking engine 302 or like functionality may generate one or more reports 310 about any possible inconsistencies.

A cloud administrator 312 may use these alerts 310 to fix the inconsistencies that can lead to problems later, for example based on one or more inconsistency remediation actions 314. The cloud administrator 312 may be a human actor in one embodiment who may invoke one or more inconsistency remediation actions 314 to be performed. In another aspect, the cloud administrator 312 may be an automated agent, e.g., a computer modules or agents programmed to automatically invoke one or more inconsistency remediation actions 314 based on one or more inconsistency reports 310. In one aspect, one or more of the inconsistency remediation actions 314 may include an action that alters the input to the system 304. The methodology of the present disclosure may include observing the change, if any, in the output of the system 304.

In one aspect, a methodology of the present disclosure considers errors in the configuration of infrastructure layer due to reboots and operator errors, among others. The methodology of the present disclosure may also include converting distributed network configuration of the end-hosts into a single view, and may compare controller configuration with the end-host configuration to detect differences.

As described above, an approach is presented in the present disclosure to systematically identifying the state inconsistencies between controller and end hosts. In one embodiment of the present disclosure, the network states may be modeled at three layers: Layer 2 state, which indicates the MAC-layer network to which each Virtual Machine (VM) connects; Layer 3 state, which represents the IP level reachability between VMs; and Layer 4 state, which describes the sets of rules for accepting/rejecting packets of various protocols and ports for each VM. Briefly, Layer 2 represents data link layer, Layer 3 represents network layer and Layer 4 represents transport layer in the OSI model.

Figure 4:
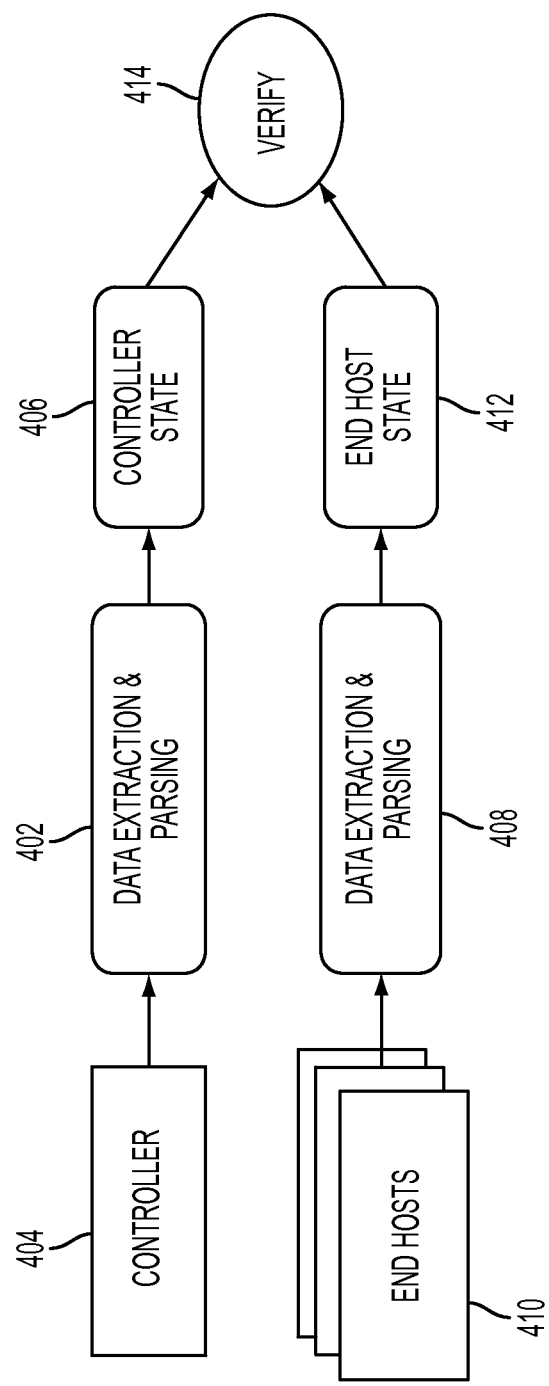
FIG. 4 is another diagram that illustrates an overall approach for state inconsistency identification methodology of the present disclosure in one embodiment.

FIG. 4 is another diagram that illustrates an overall approach for state inconsistency identification methodology of the present disclosure in one embodiment. As illustrated in FIG. 4, the methodology in one embodiment of the present disclosure may include extracting the state data from a SDN controller, which may be stored in a database. By parsing this data, the methodology of the present disclosure in one embodiment obtains the network states that should be implemented in the network. For instance, at 402, data is extracted from a controller 404 and parsed to obtain a controller state 406. The methodology may also include deploying a light-weight agent on each end host to extract the virtual network configurations, and parse out the network states that are actually implemented. For instance, at 408, data is extracted from one or more end hosts 410 and parsed to obtain an end host state 412. The two sets of network states may be sent to a central verification server, which compares and identifies any inconsistencies between them. For instance, the controller state 406 and the end host state 412 are compared to verify at 414 the differences or inconsistencies.

The methodology of the present disclosure in one embodiment may implement the following features in identifying inconsistent states:

Network State Representation: in a cloud environment, large set of network configuration data may be processed from the edge devices. A methodology of the present disclosure in one embodiment may provide representations or common formats for network states, e.g., layer 2-4 network states, respectively. A methodology of the present disclosure in one embodiment may efficiently map raw configuration data into such state representations, e.g., as described above, convert controller and end host data into the state representations as common formats.

Continuous State Verification: in SDN, network configurations tend to change frequently. The fact that the controller state and the actual state constantly evolve imposes another challenge: while the controller state can be captured, the actual state may be "in transit" at the time when a configuration snapshot is taken from end hosts. A mechanism is developed in one embodiment to distinguish between a legitimate transient state and an invalid, inconsistent state.

System Design and Implementation: A verification system may be implemented for a cloud infrastructure, e.g., which may be used in a large scale production cloud. Various data processing and caching mechanisms may be developed to reduce its overhead. The methodologies of the present disclosure may quickly identify network state inconsistencies in real cloud environments.

Network State Representation

In one embodiment, a methodology of the present disclosure characterizes the network states for both controller and end hosts using a common format. Since SDN allows configuration of network functions at three different layers, the methodology of the present disclosure in one embodiment may define network states correspondingly. The following illustrate example mappings or common format. Other mappings are possible.

Layer 2 State: defines VM's MAC layer connectivities, i.e., whether a VM can receive ethernet packets from certain L2 network. The L2 state is defined as a mapping between the two, for example:

$$\text{Map}_{12} = \{MAC_i : \text{Network}_j\} \quad (1)$$

where $MAC_i$ represents the MAC address of a VM's vNIC, and $\text{Network}_j$ represents the L2 network (uniquely identified by an identifier (ID), e.g., external VLAN ID) it is attached to.

Layer 3 State:

defines the IP layer reachability between VMs, and between a VM and the external network. The connectivity within the private network, for example, is defined as a binary matrix $$\begin{pmatrix} & IP-MAC_1 & IP-MAC_2 & \cdots & IP-MAC_M \\ IP-MAC_1 & r_{11} & r_{12} & \cdots & r_{1M} \\ IP-MAC_2 & r_{12} & r_{22} & \cdots & r_{1M} \\ \vdots & \vdots & \vdots & \ddots & \vdots \\ IP-MAC_M & r_{M1} & r_{M2} & \cdots & r_{MM} \end{pmatrix} \quad (2)$$

If a VM with IP and MAC address combination, $IP\text{-}MAC_i$ can reach another VM with $IP\text{-}MAC_j$, then $r_{ij}=1$; otherwise, $r_{ij}=0$. Note that because the same IP address can be reused in different private networks, both IP and MAC addresses are used to uniquely identify a VM's vNIC at layer 3. For example, in cases where a VM can connect to the external network if and only if it is assigned with a public IP by the network address translation (NAT) router, VMs' connectivity to the external network may be represented as the following mapping:

$$\text{Map}_{public\ 13} = \{IP\text{-}MAC_i : \text{Public IP}_j\} \quad (3)$$

where Public $IP_j$ represents the public IP address that a VM is NATed to, if it can reach the external network.

Figure 5:
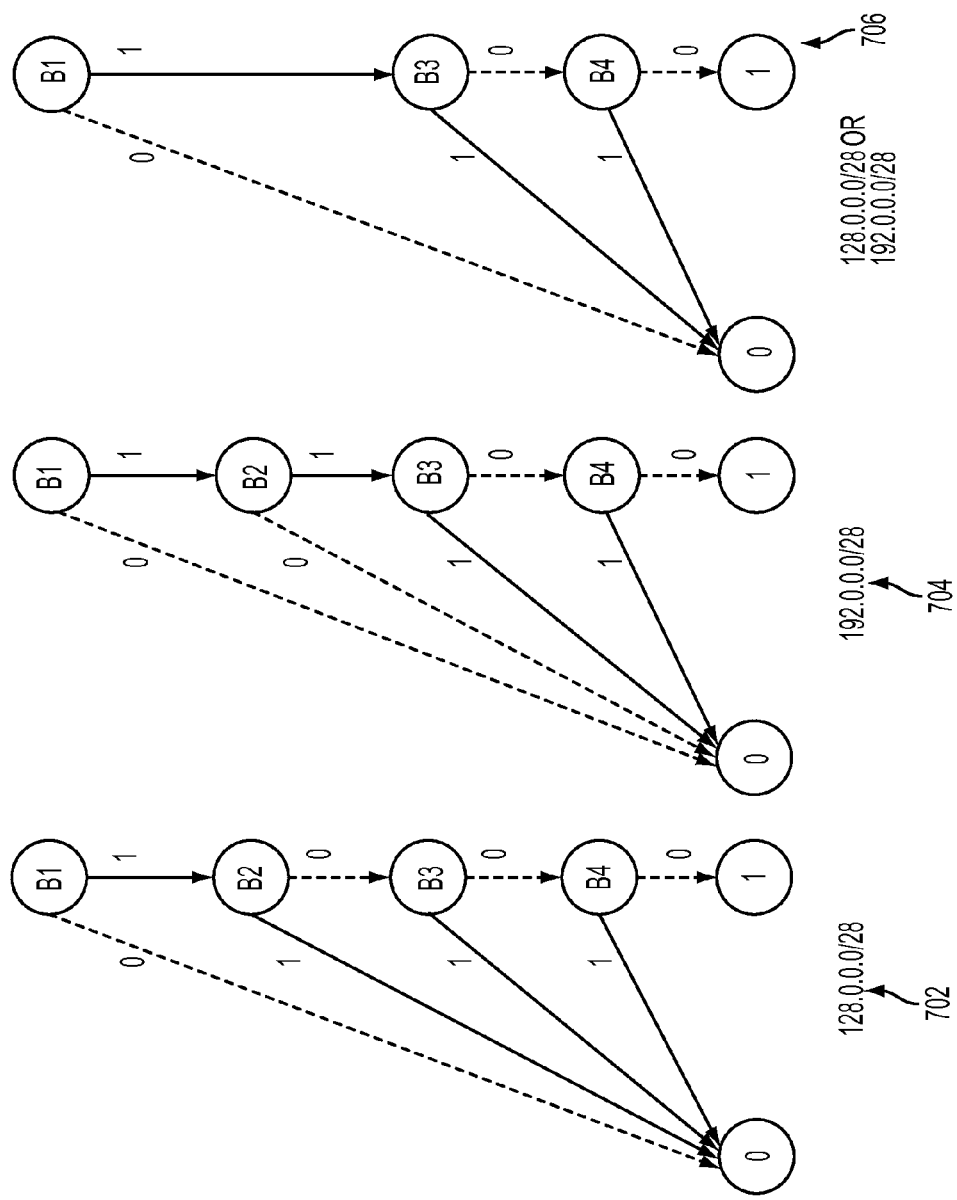
FIG. 5 illustrates example binary decision diagrams (BDD) representing L4 network layer states in one embodiment of the present disclosure.

Layer 4 State: defines each VM's security groups and the associated packet filtering rules. An example representation of L4 state may include Binary Decision Diagram (BDD). Specifically, as an example, for each iptables rule, the methodology of the present disclosure in one embodiment may generate a bitmap representation, which for example may have five fields, with a total of 98 bits: source IP range (32 bits), destination IP range (32 bits), protocol (2 bits), source port (16 bits), and destination port (16 bits). This bitmap can then be presented in the form of a BDD, which compactly and uniquely represents a set of boolean values of these fields, and the corresponding actions when the values of these fields match certain conditions. An example of a BDD is shown in FIG. 5. In the example, a BDD has two end nodes: 0 represents the reject action, 1 represents the accepted action. $B_n$ represents the n th bit that needs to be checked. Using this structure, IP address sets 128.0.0.0/28 and 192.0.0.0/28 can be represented as 702 and 704, respectively, in FIG. 5.

Note that with BDD, set operations, such as Union, Intersection, and Difference, can be supported. For example, to obtain the union of the two BDDs in FIG. 5, one can remove $B_2$, as the rest of the two BDDs are the same, as shown at 706 in FIG. 5. The union and intersection operations may be used to analyze the aggregate effect of of multiple iptables rules, each represented in a BDD. The difference operation is useful when comparing the BDD representations of L4 states between controller and end hosts.

Data Extraction

As described above, network configuration data are extracted from both controller and end hosts. The configuration data of the controller may be retrieved from a database that stores such data, e.g., a central database. The database may be queried to obtain the state information.

Extracting data from the end hosts may include executing certain system commands or checking the content of one or more configuration files on each end host. For example, data from configuration files such as iptables, route tables, Linux bridges may be extracted, for instance, using system commands.

State Parsing

After data is extracted, the data may be parsed into network state representations. State parsing for the controller may include directly translating the network configurations extracted from controller database into network states. State parsing for the end hosts may include determining the device connections of the end hosts, network connectivities of the end hosts, and packet handling configurations of the end hosts.

State Comparison

Once the network states or common formats representing the states of network layers (e.g., L2, L3 and L4) are obtained, the state consistency between controller and end hosts may be verified by comparing the two sets of states. The following illustrates example methods of comparing the network states.

L2/L3 State Comparison: L2 states may be represented as a set of mappings between VM's MAC address and L2 network in one embodiment, e.g., as defined in Eq. (1). The two mapping sets may be compared, corresponding to the controller state and end host states, and different mappings may be identified.

Similarly, the L3 states of VM's reachability to public networks may be also represented as a set of mappings in one embodiment, e.g., as described in Eq. (3). The state comparison also may involve identifying different mappings between controller and end host states. The L3 states of inter-VM reachability may be represented as a binary matrix in one embodiment, e.g., as stated in Eq. (2). The two matrices from controller and end hosts may be compared, to identify any entry $r_{ij}$ that has different values.

L4 State Comparison: L4 states can be represented to describe the ingress and egress packet filtering rules for each VM. An example representation may be a BDD format. For example, if the BDDs for each VM from both the controller ($BDD_E$) and from the end hosts ($BDD_H$) are obtained, the state comparison can be achieved by comparing their difference:

$$\text{Diff}(BDD_E, BDD_H) = BDD_{66} \qquad (1)$$

If $BDD_A = \phi$, then the states are consistent; otherwise, it represents the inconsistent L4 packet filtering behavior.

Deriving the BDDs for each VM may involve traversing all of its iptables rules. In one embodiment of the present disclosure, a design of a two-level comparison approach may be presented. If a controller correctly configures the security group rules for VMs on an end host, then the iptables rules should be configured following the specific template implemented by the infrastructure. With this template, all shared iptables chains should follow a standard form, and the only variations are in the VM-specific chains, which define the security groups a VM is associated with. Plus, the VM-specific chains should contain the rules that are identical to the ones defined at the controller.

In practice, these assumptions should be true during most of the normal operations. And in these normal scenarios, it may be checked to determine whether the end host's iptables configurations follow the template, and then whether the rules for a VM match between controller and end host. All these can be done at the string level, without involving BDD calculations. If both results are positive, then the L4 states are consistent between the two.

There may be cases of anomaly that can potentially happen. The first case is the iptables configurations on the host node follow the template, but the specific configurations of a VM are different from the ones at the controller. This could happen when there is communication error between the controller and end hosts, or due to some (rare) software bugs. In this case, there may be rules mismatch for a VM between controller and an end host. Hence, the BDD parsing for the VM-specific chains may be invoked, and then these BDDs obtained from controller and the end host may be compared. Note that in this case, the BDD parsing may only involve the chains specific to a VM with mismatched rules, not the other chains shared across VMs.

Another case is when the iptables configurations on an end host do not even follow the template. This could happen when configurations are manually modified by system administrator or by other program. In this case, the BDDs may be generated for all rules defined on the end host, and then the L4 state for each VM may be parsed out. Doing so may fully verify the BDDs obtained from end hosts against those from controller.

Continuous Verification

The methodologies of the present disclosure may support both static and dynamic SDN states. For example, for configurations that change, e.g., frequently, a method of the present disclosure in one embodiment may continuously identify inconsistencies. For example, adding and/or deleting VM, adding and/or deleting subnet, updating virtual router, updating security group, etc., to an infrastructure can affect VMs' network configurations. A method of the present disclosure in one embodiment may continuously snapshot the configurations from controller and end hosts. In one embodiment of the present disclosure, the snapshot time may be considered as a factor in the design of a verification system. On a controller, since all legitimate state changes are triggered there, and all state may be tracked in a central database, a method may include taking a snapshot every time a user makes a change. On end hosts, the network configurations may be collected by agents in a distributed manner. The complete state may be pieced together using the snapshots taken from individual end hosts. End host state may be collected from many configurations. In one embodiment, a method may include taking end host snapshots in a periodic fashion. The method may also include compensating or handling cases in which the controller and end host snapshots are not taken at the same time. When a configuration change is triggered at the controller, it may take variable amount of time to propogate to different end hosts. As a result, even with a legitimate network state change, the snapshot taken from end hosts may not match any snapshot from controller, since the state of some end hosts could be 'in transit' at the snapshot time.

Figure 6:
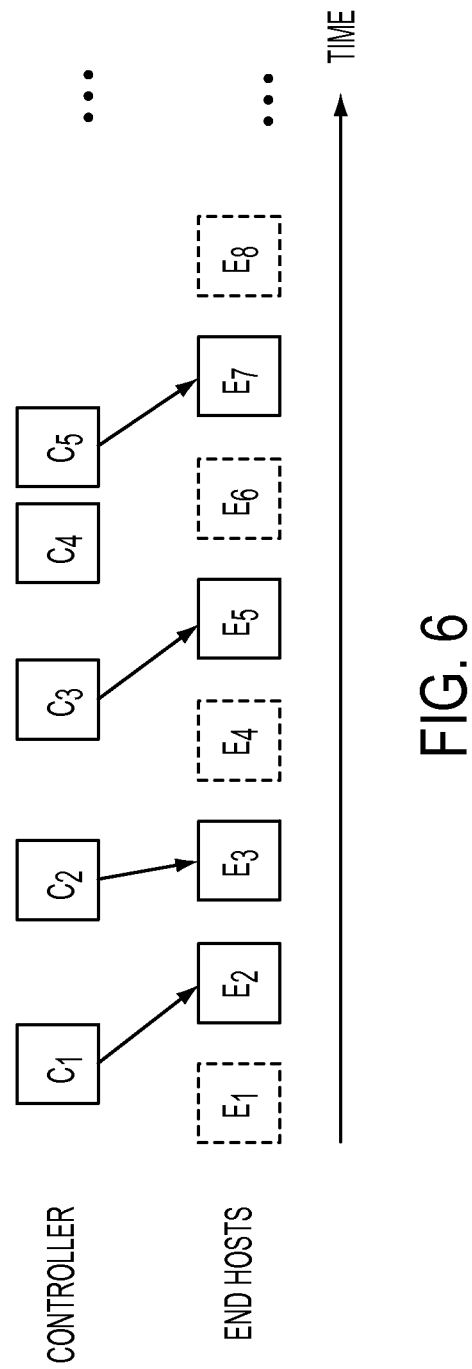
FIG. 6 illustrates an example of a continuous state comparison between controller and end hosts in one embodiment of the present disclosure.

FIG. 6 illustrates an example of continuous state comparison between controller and end hosts in one embodiment of the present disclosure. For instance, in FIG. 6, controller states $C_1$, $C_2$, $C_3$, $C_5$ match with end host states $E_2$, $E_3$, $E_5$, $E_7$, respectively. The other end host states are in-transit states. For example, $E_4$ is a temporary state between $E_3$ and E5, and does not match with any controller state, because of the time its snapshot is taken. Also note that some controller state, e.g., $C_4$ may not have exact match with any end host state either, because the end host snapshot may not be taken after the corresponding configurations are set.

In an embodiment of a method of the present disclosure, a moving window may be used to take a sequence of state snapshots from controller and end hosts, respectively. With a same time window (e.g., assuming that the controller and end hosts have synchronized clocks), the method may then compare the two to 1) determine the exact matches between controller state sequence [C] and end host state sequence [E], and 2) identify whether some of the unmatched end host states are in-transit state, or inconsistency.

For 1), the following sequence alignment method may be used. For controller state sequence [C] and end host state sequence [E], we seek the best matching subsequence [$C_1$, $C_2, \ldots, C_i] \subset [C]$ and end host states $[E_1, E_2, \ldots, E_j] \subset [E]$. We define the highest matching score between the two as $H_{i,j}$, which can be iteratively found using dynamic programming:

$$H_{i,j} = \max \begin{cases} H_{i-1,j} - d \\ H_{i,j-1} - d \\ H_{i-1,j-1} + \text{Match}(C_1, E_j) \end{cases} \quad (2)$$

where Match($C_i$, $E_j$) denotes the matching score between snapshot $C_i$ and $E_j$, d is a penalty for having one snapshot, either in [C] or [E], unmatched with any snapshot in the other sequence. We set Match($C_i$, $E_j$)=0 if $C_i$ does not match $E_j$, Match($C_i$, $E_j$)=2d if $C_i$ matches with $E_i$ and $C_j$ was taken earlier than that of $E_j$, and Match($C_i$, $E_j$)=(−100)d if $C_i$ matches with $E_j$, but the snapshot of $C_j$ was taken later than that of $E_j$. The last case is when the state snapshot from controller matches with an earlier state from end hosts, which is a mistake that should be avoided. Once we find $H_{i,j}$ for all possible subsequences of [C] and [E], we pick the one with the highest score to be the best matching between [C] and [E]. Note that this method assumes that the first snapshots in [C] and [E] are always a match, which can be guaranteed by setting a state comparison window to always start with the last matching snapshot in the previous window.

For 2), the following method may be used. For L2 state, the controller can potentially change a VM's association from one L2 network to another. An in-transit end host state means a VM's L2 association still reflects the previous controller state. For example, if L2 state sequences are represented in FIG. 6, if $E_4$ matches $C_2$, $E_4$ can be deemed an in-transit or delayed end host state. The same logic works for the VM's L3 association with public networks.

For L3 reachability between VMs, a method may include evaluating the reachable IP address set for every private network, as the L2 association between VMs and the private networks may be known already. In this case, to determine whether an end host state is in transit between two consecutive controller states, a method may evaluate whether this end host state (an IP address set) contains the configurations intersect between the two controller snapshots, but does not contain any configuration beyond their union. For instance, in FIG. 6 for a private network being evaluated, assume there are two controller states $C_2$={10.0.2.0/24, 10.0.3.0/24} (reachable IP addresses) and $C_3$={10.0.3.0/24, 10.1.4.0/24, 10.0.5.0/24}. If end host snapshot $E_4$={10.0.2.0/24, 10.0.3.0/24, 10.1.4.0/24}, then it is an in-transit state between $C_2$ and $C_3$. However, if $E_4$={10.0.2.0/24, 10.1.4.0/24}, then it may be be deemed an illegal state. The L4 in-transit state determination may follow a similar approach, except that the state is represented as accepted packet sets, e.g., represented as BDD.

System Design

Figure 7:
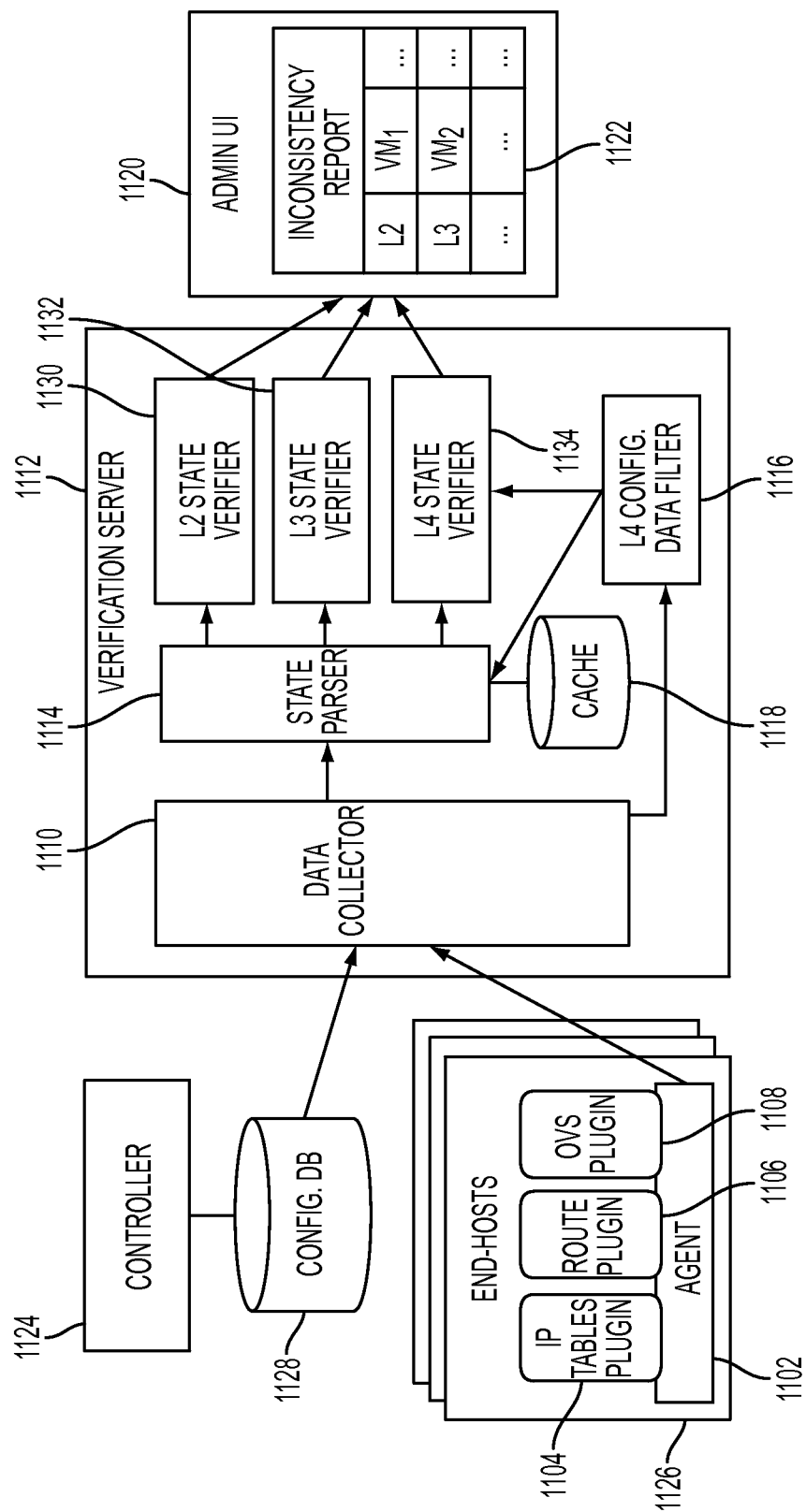
FIG. 7 is a diagram illustrating a verification system in one embodiment of the present disclosure.

Following an overall methodology described above, a state verification system in one embodiment may include three subsystems: a) data collection subsystem, b) state parsing subsystem and c) state verification and reporting subsystem. FIG. 7 is a diagram illustrations a verification system in one embodiment of the present disclosure.

The data collection subsystem may be responsible for collecting all the data required for state verification. It may include i) data collection agent 1102 residing on each end host, with plugins (e.g., 1104, 1106, 1108) that can be invoked to collect various virtual network configurations, e.g., iptables rules, routing tables, etc., and ii) data collector 1110 residing on the verification server 1112, which is responsible for receiving the data collected from the agents on the end hosts, as well as for issuing queries, e.g., SQL queries, to collect configuration data from a controller 1124, e.g., stored in a controller database 1128.

The data collection agent 1102 may be implemented as a lightweight program in one embodiment. "File-Per-Table" mode may be enabled on the controller database, so that each table is stored in its own data file. In one embodiment, the data collector 1110 may snapshot database table only when the corresponding data file is modified. The data collection agent 1102 on end hosts 1126 may be invoked periodically as a cron job, e.g., a background process. To support continuous verification, the system may use network time protocol (NTP) to ensure clock synchronization between these agents. In one embodiment, both the data collection agent and the central data collector may be designed with a pluggable architecture. They can be extended to collect new data sources or data from other cloud management systems.

The data processing subsystem may include a state parser 1114 that ingests all the data from the data collector 1110 and parses it into the layers of network state representations. Since L4 state parsing may be a computation intensive task, the system may implement a configuration data filter 1116 to perform the two-level comparison, as described above. For example, in one embodiment, only if the filter determines L4 state parsing is needed, will the state parser convert the configuration data into a representation such as BDD. To further reduce the overhead of L4 state parsing, the state parser 1114 may store previous parsing results in a local cache 1118. Whenever a new L4 state parsing is requested, the cache 1118 may be checked. If there is a hit in the cache 1118, the state BDD may be directly retrieved from the cache 1118. To support continuous verification, additional processing such as deleting duplicate state snapshots may be performed.

The state verification and reporting subsystem may take the state representations, e.g., L2, L3, and L4 state representations, obtained from both the controller 1124 and end hosts 1126, e.g., in each verification window, and generate inconsistency alerts. For instance, verifiers for L2, L3, and L4 (e.g., 1130, 1132, 1134) may perform verification of the states as described above. The state inconsistencies can be presented as an integrated part of an administrator user interrace (UI) 1120.

All components described above may be implemented in Python or another computer language. In one embodiment, the end host data collection agents 1102, 1104, 1106 may run on end hosts 1126. A state inconsistency reporting function may run as part of an administrator user interface program or module 1120 and produce reports 1122, for example, on an administrator computer or device. All other functions may run on a central verification server 1112. In one embodiment, the central verification server 1112 may be hosted in a management network of a cloud infrastructure. In one embodiment, the central verification server 1112 may be hosted in the same data center network as the end hosts, controller 1124 and the administrator computer. In one embodiment, the controller 1124 comprises one or more hardware processors, the end-hosts 1126 comprise one or more hardware processors, and the verification server 1112 comprises one or more hardware processors.

L4 State Cache

In one embodiment of the present disclosure L4 network configurations may be represented by BDDs. L4 network configuration data may be converted into BDD representations, e.g., in a network state parsing stage. In one embodiment, the system of the present disclosure may optimize this conversion process by implementing a cache 1116 in the L4 state parser.

If network configuration changes are small between two consecutive verifications, the later verification can reuse most of the BDDs generated in the previous rounds of verifications. Even if one runs the verification for the very first time, since most of L4 security group rules are common between the controller and end hosts, the BDDs generated from the controller can also be reused in end host state parsing. So the cache may keep a copy of BDDs, irrespective of whether they are generated from the controller or end hosts, as the system parses the iptables rules. At the verification step, if BDD parsing is needed for a set of rules, the parser may first check whether the target rules already have BDDs in its cache. If yes, then the parser may avoid parsing the same rules again. To achieve the maximal gain, caches may be designed for both individual rules and traversed chains.

In caching for individual rules, e.g., whenever a rule of form (S, action) is encountered, where S is the string defining the matched packet set, the system may cache the BDD calculated for this rule, indexed by string S. The system may also cache (partially or fully) traversed chains. When traversing iptables chains, the system may cache the intermediate results after parsing each additional chain. Each cache item is indexed by the ordered list of the rule strings (including all the string definitions S) in the corresponding traversal. For example, after traversing the iptables chains in FIG. 8, all individual rules in chain X, Y, Z, and J may be cached. BDDs for all partially and fully traversed chains may be also cached, i.e., $Z=\{Z_1\}$, $\{J_1\}$, $J=\{J_1, J_2\}$, $\{Y_1, J\}$, $\{X_1, X_2, Y\}$ and $X=\{X_1, X_2, Y, Z\}$, etc. With this caching mechanism, the system can maximally reuse previous parsing results if only a small portion of the chains are modified. When the L4 state parser is requested to parse a new chain, it may first look up the full chain cache for exact match. Since a chain can call other chains, an exact match can be claimed for a chain only if all its descendant chains have exact match. In an example implementation, the system may index all chains by topological ordering in the calling relation graph and always parse the chains with lower order first. So when the system parses a chain, all its descendant chains must have been parsed. The system can check cache hit for this chain. If there is no exact match, it may then look for maximally matched partial chain, and only parse the BDD for the unmatched parts of the chain. If partial chain match cannot be found, it may look up the BDD cache for individual rules, then traverse the rest of the chain to calculate the BDD for the entire chain.

State inconsistency is a problem that can potentially arise in any edge-based SDNs. In one aspect, the specific design and implementation may differ based on the specific SDN environment. As an example to illustrate a methodology of the present disclosure, the following description uses OpenStack as a target environment. But it should be understood that the methodologies of the present disclosure may operate in other cloud or computer infrastructure environments.

Figure 10:
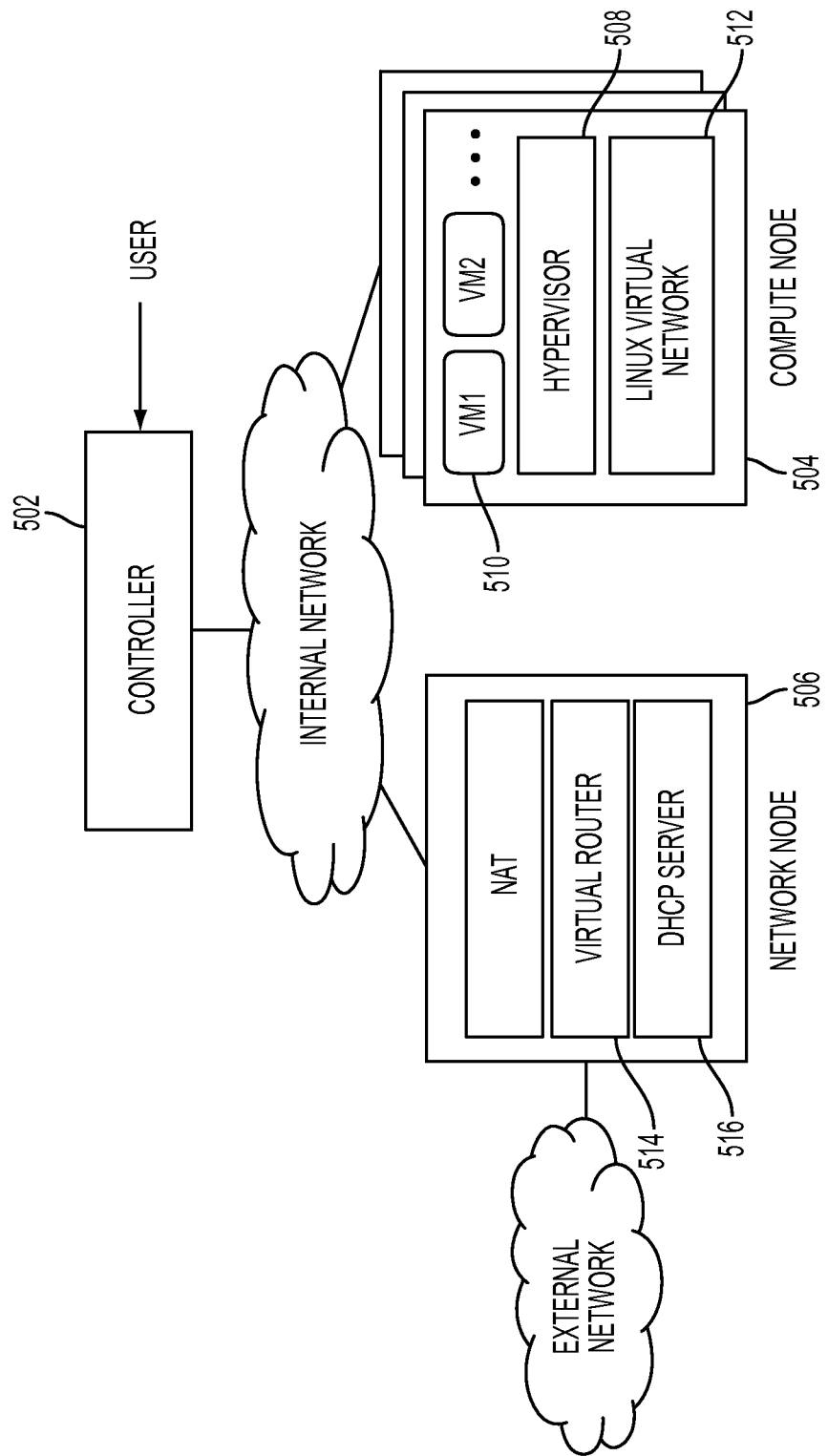
FIG. 10 illustrates Software Defined Networks (SDN) elements of an example cloud environment.

FIG. 10 illustrates a typical edge-based SDN setup in an example cloud environment involving three types of nodes: Controller node 502, which handles user requests for defining network services; Compute node 504, which is the end host that runs hypervisor 508 to host VMs 510 and implements the virtual network configurations 512 for these VMs; Network node 506, which serves multiple roles, including virtual routers 514, Dynamic Host Configuration Protocol (DHCP) servers 516, and others, in order to support the communications between different virtual networks. In a cloud data center, these different types of nodes are typically connected by hardware switches. The virtual network functions are defined by the user at the controller 502 via API calls, and communicated to the compute 504 or network 506 nodes, via Advanced Message Queuing Protocol (AMQP) messages, for actual configuration.

The controller 502 allows a user to define: 1) Layer 2 networks; 2) Layer 3 subnets that are associated with a block of Internet Protocol (IP) addresses and other network configurations, e.g., default gateways or DHCP servers; 3) virtual interfaces that can attach to a Layer 2 network as well as an IP address; 4) VMs that are attached to designated networks; 5) Layer 4 security group rules that determine the protocols and ports of the traffic admissible to selected VMs. These high-level network function definitions are stored in a central database.

Figure 11A:
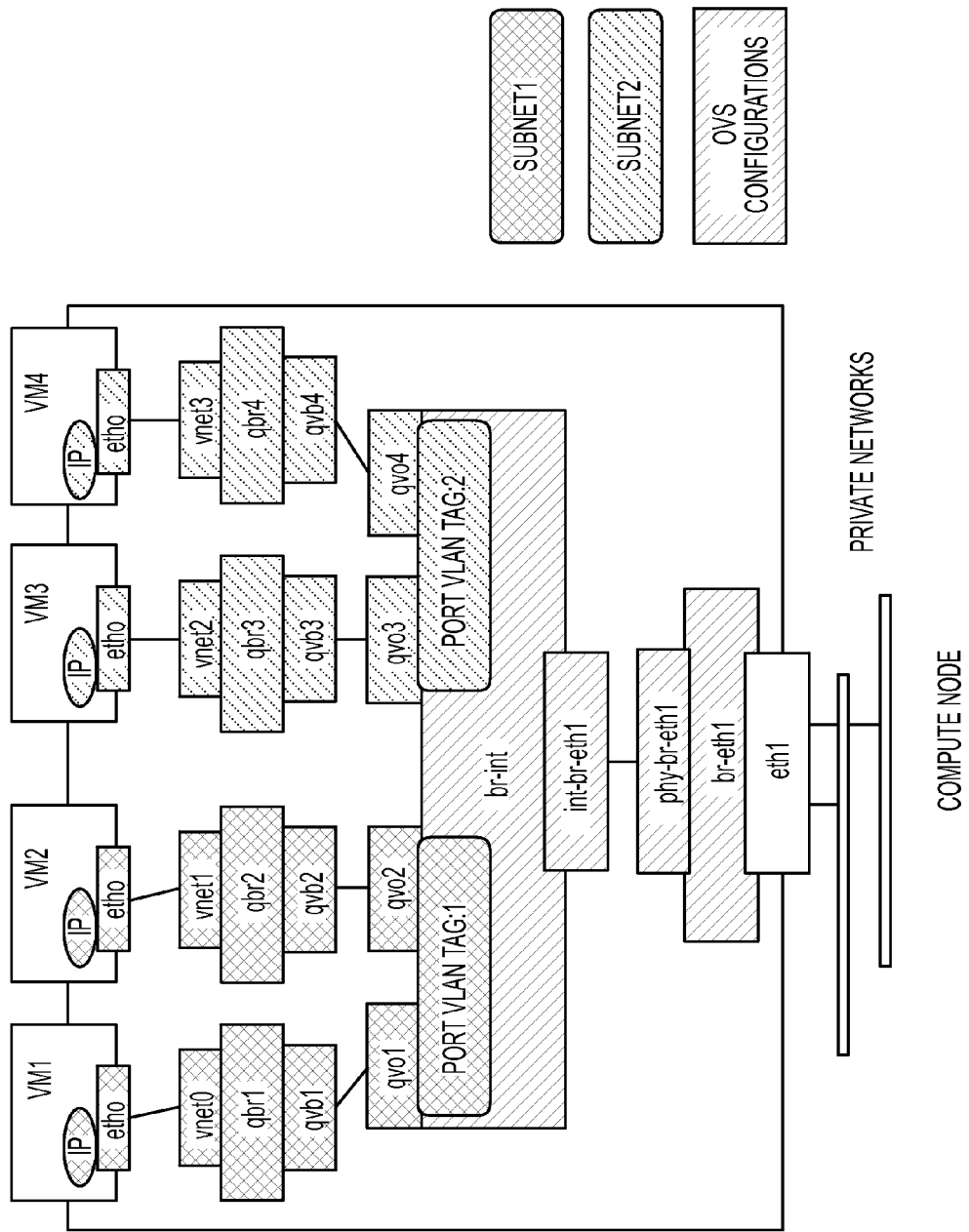
FIGS. 11A and 11B illustrate sample SDN configurations in nodes of an example cloud environment.
Figure 11B:
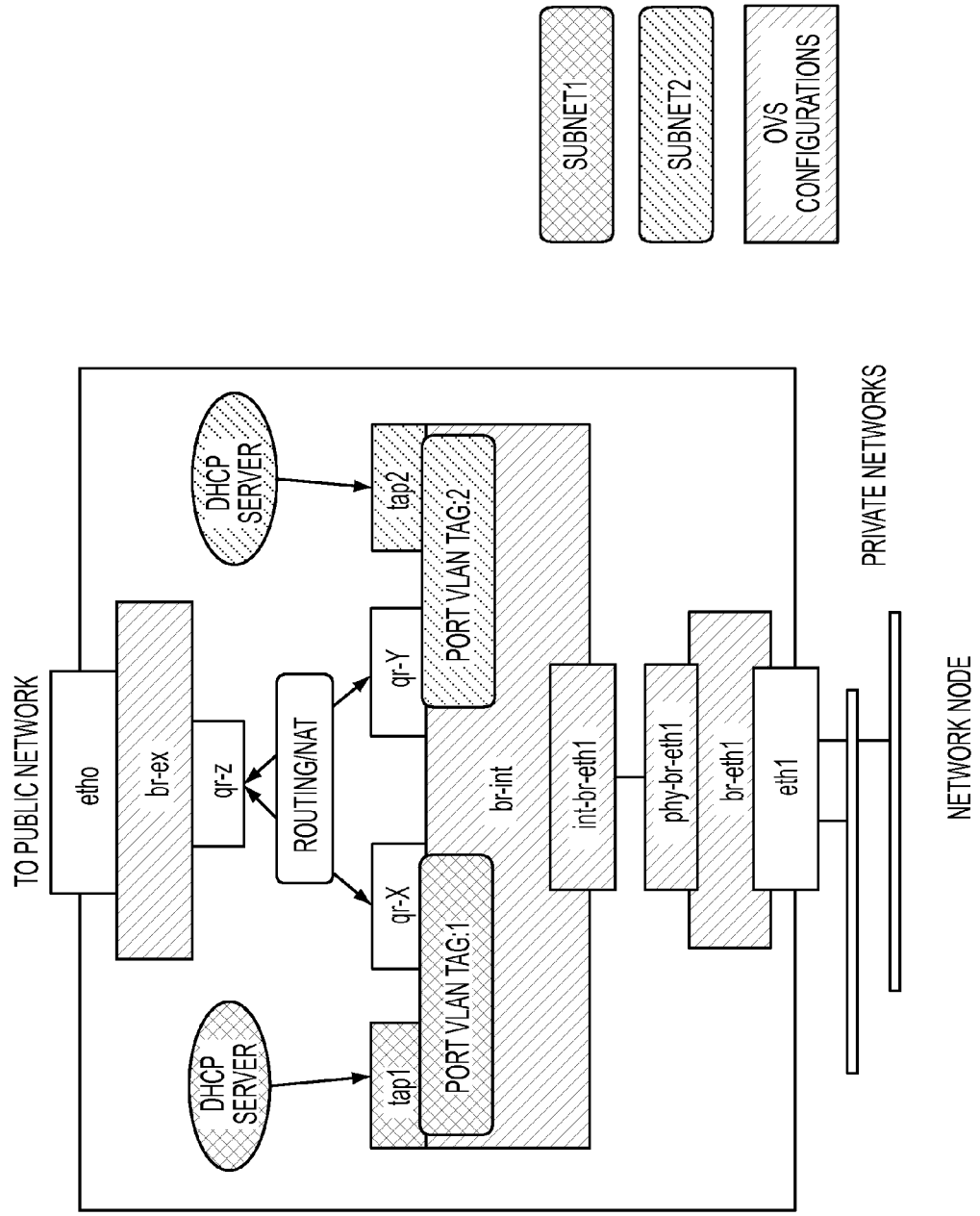

The network functions defined on the controller 502 are eventually translated into system configurations on the compute 504 or network 506 nodes, implemented using different technologies, e.g., Open vSwitch (OVS), e.g., as shown in FIGS. 11A and 11B. FIGS. 11A and 11B illustrate sample SDN configurations in compute and network nodes, respectively, of a cloud infrastructure.

L2 network function is implemented as internal VLANs by OVS. Internal VLANs are defined in Linux operating system (OS), which are different from the VLANs configured on physical switches. On a compute node, VMs in the same L2 network are attached to the same VLAN via virtual network interface cards (vNICs), Linux kernel devices, bridges, etc. For example, in FIG. 11A, VM1 has a vNIC eth0 connecting to a network tap (TAP) device vnet0, which connects to a virtual ethernet interface pair qvb1 and qvo1 through Linux bridge qbr1, and then connects to VLAN 1. Across compute nodes, VMs attached to the same VLAN are connected to each other via a private network, which is either a switch-configured L2 network, or IP tunnels. Briefly, TAP is a virtual ethernet network device. TAP simulates a link layer device and it operates with layer 2 packets like Ethernet frames, and is used for creating a network bridge.

L3 network functions are implemented mostly on the network node, e.g., shown in FIG. 11B. The network node provides DHCP services to each L2 network, and assigns IP address to VMs. Through OVS, it also defines the routing between different subnets, as well as between subnets and the public network. The routing function also supports network address translation (NAT) for different subnets to communicate with each other.

L4 security groups are implemented as iptables rules in compute nodes, which include subset of rules for accepting or rejecting certain types of traffic from/to each VM. The methodologies of the present disclosure in one embodiment addresses state verification in edge-based SDN. In one aspect, a methodology of the present disclosure may traverse and model iptables for L4 state extraction.

For controller data extraction, as an example, the quantum database table in the example cloud environment's controller contains all network states that are supposed to be implemented. So for example, such database may be queried to obtain the state information. For example, each subnet's IP range and gateway's IP may be obtained by running SELECT network_id,cidr,gateway_ip FROM subnets.

Table 1, lists examples sources from which end host configurations may be extracted, e.g., when the example cloud environment's quantum networking functions or like are used.

TABLE 1

Source of configuration data for the example cloud environment SDN functions

| Source | Command/File Path | Network Layer |
|---|---|---|
| IPTable | iptables -t table_name -L -n | L4 |
| Routing Table | netstat -rn | L3 |
| Linux Bridge | brctl show | L2 |
| Open vSwitch | ovs-dpctl show | L2 |
| | ovs-vsctl show | |
| | ovs-ofctl dump-flows bridge_name | |
| Veth Pair | ethtool -S device_name | L2 |
| Network Namespace | ip netns | L2, L3 |
| | ip netns ns_name command | |
| VM Info | virsh list - all | L2, L3, L4 |
| | virsh dumpxml domain_name | |
| IP Address | ip addr | L2, L3 |

For L2 state, network to which a VM's vNIC is attached is determined. A data extraction agent on each compute node may execute the related commands (or the like for another computer or cloud infrastructure) in Table 1, collecting the information regarding the vNIC, virtual devices, internal VLANs, and the connections among them. For L3 state, the agent extracts routing tables from the network node, Linux name space, VMs and their IP addresses from the compute nodes, etc. For L4 state, the raw data includes iptables rules implemented in the OS of compute node. By executing the system commands as shown in Table 1 (or the like), the agents can extract the rules applicable to each VM.

L2 State Parsing:

On a compute node, L2 state can be parsed by traversing the virtual device connections between each VM's MAC address and the internal VLANs configured on the hypervisor host. Across compute nodes, the internal VLAN may be mapped to an external L2 ID by Open vSwitch. Since the external L2 ID is assigned across compute nodes, the VMs' associations to external L2 IDs may be used to determine which VMs belong to the same L2 network. In this example, the external L2 ID maps to the network in Eq. (1).

L3 State Parsing:

L3 network states include both the IP-level reachability between VMs, i.e., Eq. (2), and their connectivity to the external networks, i.e., Eq. (3). For the former, for each pair of VMs, a check may be performed to determine whether they are connected in the same L2 network. If they are in the same L2 network, and their IP addresses are also configured to the same subnet, then they can reach each other. If they are not in the same subnet, a check is performed to determine whether the two VMs use the same virtual router in the network node as gateway. If they do, then it is checked whether the virtual router is configured with routing entries that support the IP routing between the two IP subnets. For the latter, a check is performed to determine, for each VM's private IP address, whether its gateway virtual router has the corresponding routing entry to allow it to reach a public IP address. In addition, a check is performed to determine whether the virtual router implements NAT rules to translate between the two IP addresses. For this, the corresponding rules in iptables is traversed, following a procedure that will be discussed next.

L4 State Parsing:

L4 state parsing may involve analyzing each VM's security group configurations to generate representations corresponding to its ingress and egress packet handling actions. An example representation is BDD.

Figure 8:
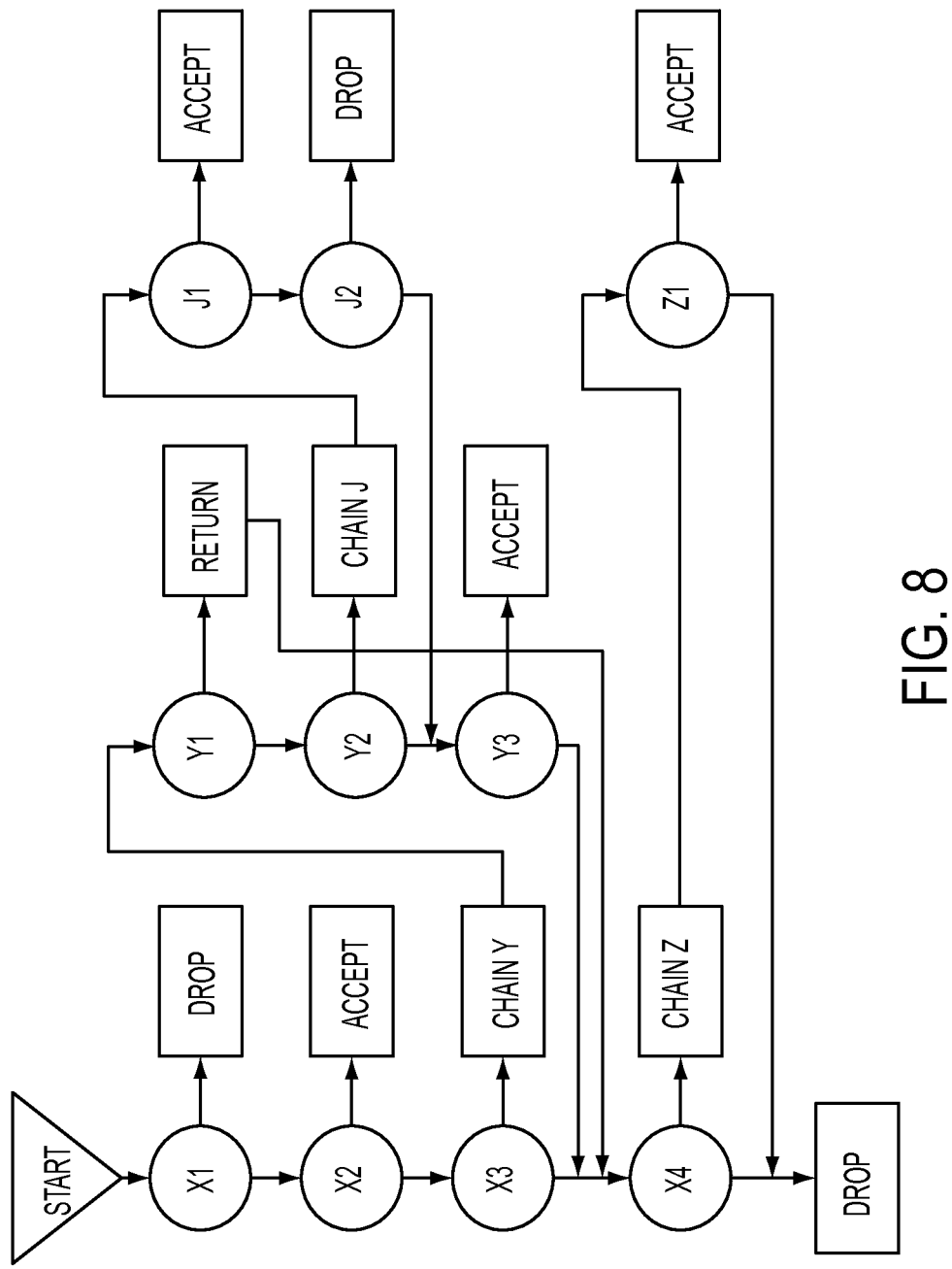
FIG. 8 shows an example of iptables chain in one embodiment of the present disclosure.

In end host, iptables rules are organized in chains. Each chain contains a sequence of rules, each of which defines a matching packet set, and the associated action accept, drop, return, or call another chain. FIG. 8 shows one example of iptables chain. In the example, chain X is the main chain with default action drop. It calls chain Y at rule $X_3$, and another chain Z at rule $X_4$. Chain Y further calls chain J, and so on. The calling relation between chains may be characterized using a graph, in which each chain is represented by a node, and a directed link goes from X to Y, if chain X calls chain Y. Since there is no calling loop at the chain level, the calling relation graph is an acyclic graph. For example, FIG. 8 can be abstracted as a tree rooted at the main chain X.

To generate the BDD representation of a VM's L4 state, the entire iptables chain may be traversed. Algorithm 1, for example, may parse all the rules of a chain sequentially to obtain the accepted/dropped packet sets (A/D), and the set of packets (R) triggering the action of returning to the calling chain, respectively. C denotes the set of packets that have not been matched by any rule yet, and is initialized to the set of all packets P. After parsing a new rule, which has the set of matched packets (M), rule action (action), and the chain to be called (CalledChain, if the action is 'call'), the algorithm updates the unmatched packet set C, and adds the newly matched packets (M∩C) to the set corresponding to the action type (line 6 to 11). If the action is to call another chain, the algorithm recursively calls itself to traverse the called chain and obtain its accept, drop and return sets to update the packet sets of the current chain (line 13-14). Since the calling relation between the chains is an acyclic directed graph, this algorithm can correctly traverse all chains in a set of iptables configurations. Note that using this algorithm, each chain only needs to be traversed once. For the iptables traversing in L3 State Parsing, Algorithm 1 may be modified to further consider the SNAT and DNAT packet sets.

Algorithm 1: ParseChain(chain)

```
 1: A = D = R = Ø ; C = P ;
 2: while chain is not empty do
 3:    (M, action, CalledChain) =ReadNextRule( );
 4:    C = C - M ; E = M ∩ C ;
 5:    switch (action)
 6:    case 'accept':
 7:       A = A ∪ E ;
 8:    case 'drop':
 9:       D = D ∪ E ;
10:    case 'return':
11:       R = R ∪ E ;
12:    case 'call':
13:       (A₁, D₁, R₁) = ParseChain(CalledChain);
14:       A = A ∪ (E ∩ A₁) ; D = D ∪ (E ∩ D₁) ;
15:    end switch
16: end while
17: return (A, D, R)
```

Figure 9:
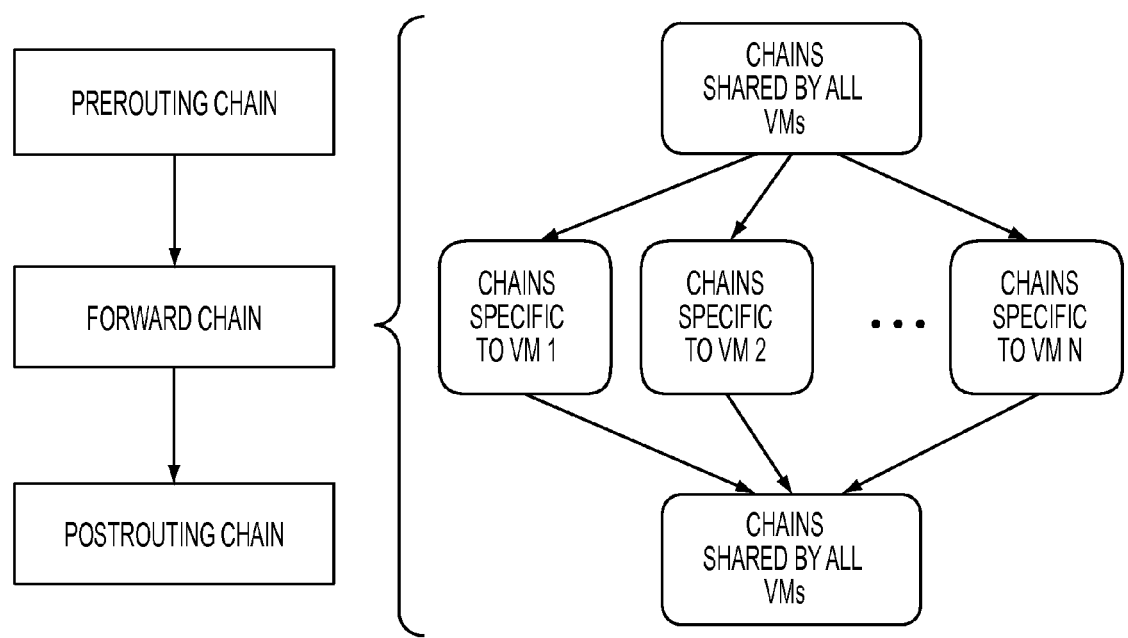
FIG. 9 shows an example structure of iptables chains on an example cloud environment's end host.

In a compute node, packets to/from a VM traverse pre-routing chain, forward chain, and post-routing chain sequentially. In the example cloud environment implementation, VM's packet filtering rules are all placed in the forward chain, which has common subchains shared by all VMs, as well as VM-specific subchains, as illustrated in FIG. 9. FIG. 9 shows an example structure of iptables chains on the example cloud environment compute node. The subchains for different VMs are uniquely identifiable by VM's physical device name or IP address.

Note that only VM-specific iptables rules are supposed to be modified by the controller during normal operations. However, on the compute node, there are other rules (e.g., those shared by all VMs in FIG. 9 that can affect individual VMs. These rules are called shared rules. The intersection between the two forms the overall L4 state of a VM. Unless it is assumed that all iptables rules, including the shared rules, on compute node can only be modified by the example cloud environment's controller and the modifications are always correct, there may be the possibility of shared rules being tempered. Therefore, a check may be performed for the validity of shared rules as well. Specifically, the BDD expression of the accepted packet set for the host may be parsed out by traversing all iptables rules. Then the accepted packet set may be obtained for a VM as a subset of the host's accepted packets that match the VM's device name.

In the above description, OpenStack is used as an example infrastructure with which the methodologies and system of the present disclosure can work with and/or applied to. It should be understood that OpenStack is only one example computing infrastructure, and the application of the methodologies and system of the present disclosure is not limited only to that infrastructure. Rather, the methodologies and system of the present disclosure can work with and/or be applied to other computing infrastructures and/or cloud infrastructures.

In one embodiment, a method and/or system of the present disclosure may include different implementation of checking. For example, if BDD representation is used, e.g., one-level BDD verification that always generates BDD for all iptables chains and rules; two-level verification without cache that first checks if the end hosts' iptables rules match with those on the controller, and performs BDD parsing only if there is mismatch; two-level verification with cache of the previously calculated BDDs.

The method and/or system of the present disclosure applied on an experiment hardware configuration environment show that the data extraction subsystem of the present disclosure only incurs modest CPU and memory overhead to the SDN components, and can finish the extraction in seconds for typical virtual network settings. The system, e.g., may take only seconds to perform state verification in a reasonably-sized SDN environment, hence can provide timely inconsistency alerts to the operator. The continuous verification mechanism of the present disclosure in one embodiment may correctly detect the state inconsistencies in a given time window. To ensure good performance, end host snapshot interval may be set to no longer than twice the average interval between consecutive controller state changes. Any other time intervals may be implemented.

In the present disclosure, the problem of network state verification in the emerging edge-based SDN in the cloud is presented. The methodology and/or system in one embodiment may include data extraction, state parsing and state verification, e.g., at L2, L3 and L4 layers. The methodology and/or system in one embodiment may use a multi-level comparison design. Multi-level comparison may reduce parsing time. In one embodiment, a hierarchical BDD caching algorithm may be utilized. Still yet, a continuous verification scheme to handle the frequent SDN state changes may be implemented. Experiments and emulation indicate that the verification system/methodology can effectively detect a variety of inconsistencies in a dynamic cloud setting, with low computational overhead.

Figure 12:
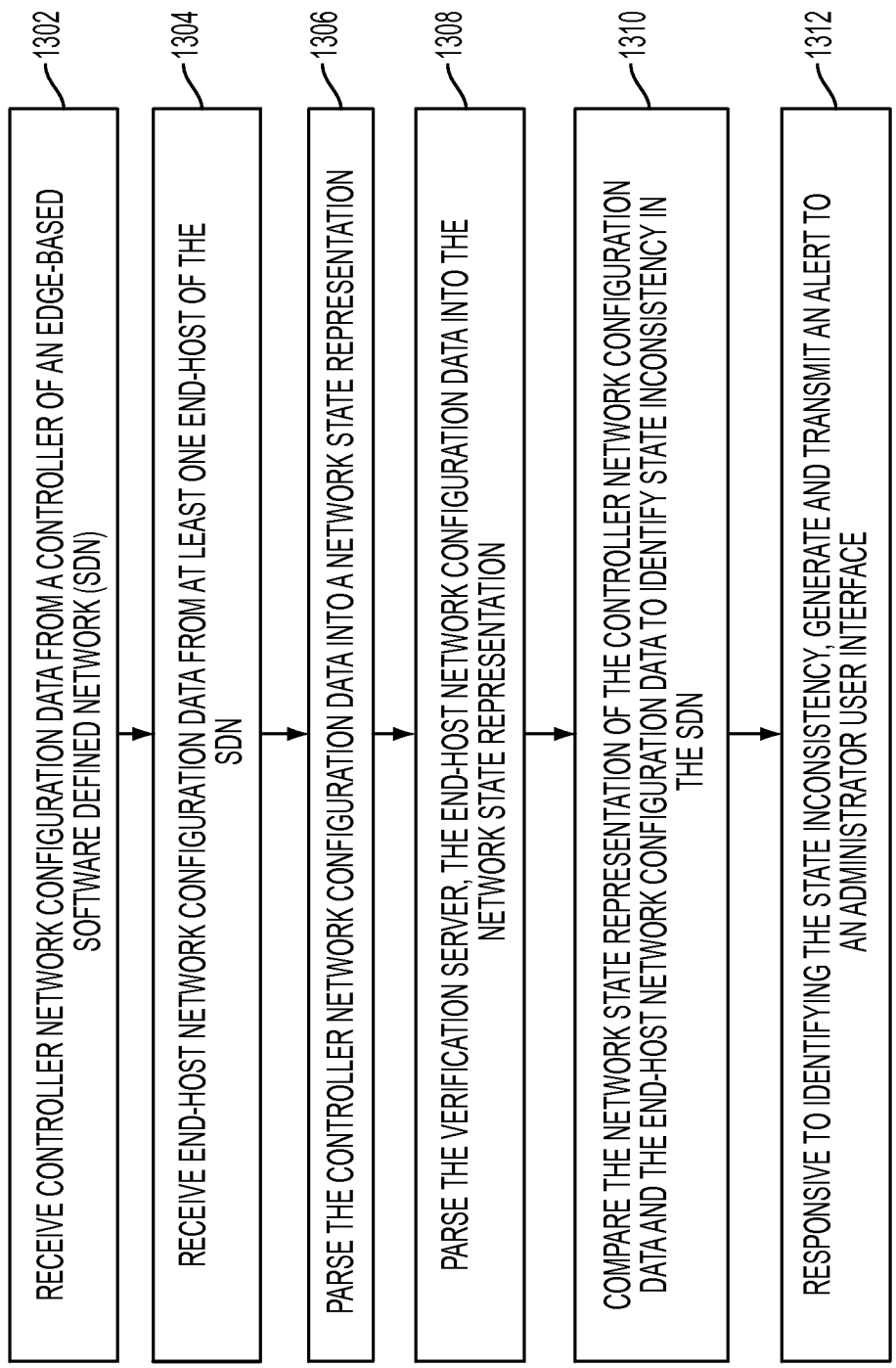
FIG. 12 is a flow diagram illustrating a method of identifying state inconsistency in edge-based software defined networks in one embodiment of the present disclosure.

FIG. 12 is a flow diagram illustrating a method of identifying state inconsistency in edge-based software defined networks in one embodiment of the present disclosure. At 1302, controller network configuration data from a controller of an edge-based software defined network (SDN) is received, e.g., by a verification server. As described above, this data may be retrieved from a controller database. For example, this may include querying a database storing the controller network configuration data that define network services specified by the controller for implementing at the end host.

At 1304, end-host network configuration data from at least one end-host of the SDN is received, e.g., the verification server. As described above, one or more agents deployed on the end-host may collect this data. For instance, the agents may execute commands on the end-host to extract the end-host network configuration data. Further details of extracting data are described above.

At 1306, the controller network configuration data is parsed into a network state representation, for example, by the verification server. For instance, the verification server may generate network state representations of the controller network configuration data, which described the controller's L2, L3, and L4 network layer states. Details of parsing the controller network configuration data and the network state representations are described above.

At 1308, the end-host network configuration data is parsed into the network state representation, for example, by the verification server. For instance, the verification server may generate network state representations of the end-host network configuration data, which described the end-host's L2, L3, and L4 network layer states. Details of parsing the end-host network configuration data and the network state representations are described above.

At 1310, the network state representation of the controller network configuration data and the end-host network configuration data are compared to identify a state inconsistency in the SDN. Details of the comparison process are described above.

At 1312, responsive to identifying the state inconsistency, an alert signal to an administrator user interface may be generated and transmitted. As described above, reports may be generated and presented via a user interface.

Figure 13:
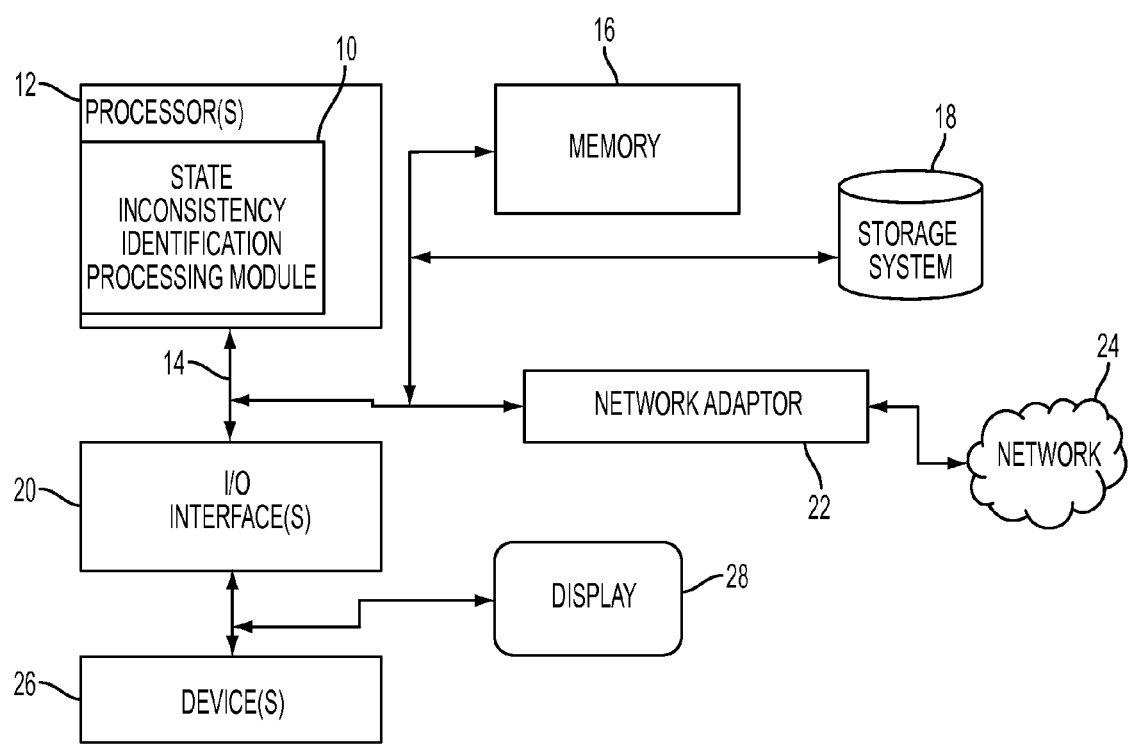
FIG. 13 illustrates a schematic of an example computer or processing system that may implement a state inconsistency identification system in one embodiment of the present disclosure.

FIG. 13 illustrates a schematic of an example computer or processing system that may implement a network state inconsistency identification system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 13 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of identifying state inconsistency in edge-based software defined networks, comprising:
   receiving by a verification server, controller network configuration data from a controller of an edge-based software defined network (SDN);
   receiving by the verification server, end-host network configuration data from at least one end-host of the SDN, the end-host of the SDN comprising at least one hardware device that acts as at least one of a virtual switch and a router;
   parsing by the verification server, the controller network configuration data into a network state representation;
   parsing by the verification server, the end-host network configuration data into the network state representation;
   comparing the network state representation of the controller network configuration data and the end-host network configuration data to identify state inconsistency in the SDN; and
   responsive to identifying the state inconsistency, generating and transmitting an alert signal to an administrator user interface.

2. The method of claim 1, wherein the generating and transmitting an alert signal responsive to identifying the state inconsistency comprises generating and presenting a report of the state inconsistency on the administrator user interface.

3. The method of claim 1, wherein the receiving by a verification server, controller network configuration data from a controller of an edge-based software defined network (SDN) comprises querying a database storing the controller network configuration data that define network services specified by the controller for implementing at the end-host.

4. The method of claim 1, wherein the receiving by the verification server, end-host network configuration data from at least one end-host of the SDN comprises receiving the end-host network configuration data from a plurality of agents deployed on the end-host, the plurality of agents executing commands on the end-host to extract the end-host network configuration data.

5. The method of claim 1, wherein the controller network configuration data and the end-host network configuration data comprise L1, L2, L3, and L4 network layer configuration states.

6. The method of claim 1, wherein the network state representation comprises a mapping between a MAC address of a VM's vNIC and an L2 network, a mapping of IP layer reachability between VMs, and a mapping of IP layer reachability between a VM and a public network.

7. The method of claim 6, wherein the network state representation further comprises a binary decision diagram describing ingress and egress packet filtering rules for each of the VMs.

8. The method of claim 7, wherein the rules are generated into a bitmap representation comprising source IP range field, destination IP range field, protocol field, source port field, and destination port field, and the bitmap representation is presented in a form of the binary decision diagram.

9. The method of claim 7, wherein the comparing the network state representation of the controller network configuration data and the end-host network configuration data comprises first comparing the rules at a string level, and only if there is a mismatch, generating the binary decision diagram for comparison.

10. The method of claim 1, wherein the controller network configuration data comprises a moving window of a sequence of controller state snapshots and the end-host network configuration data comprises the moving window of a sequence of end-host state snapshots.

* * * * *